United States Patent [19]
Douceur

[11] Patent Number: 5,907,685
[45] Date of Patent: May 25, 1999

[54] SYSTEM AND METHOD FOR SYNCHRONIZING CLOCKS IN DISTRIBUTED COMPUTER NODES

[75] Inventor: John R. Douceur, Bellevue, Wash.

[73] Assignee: Microsoft Corporation, Redmond, Wash.

[21] Appl. No.: 08/511,420

[22] Filed: Aug. 4, 1995

[51] Int. Cl.⁶ .................................................. G06F 1/14
[52] U.S. Cl. ............................... 395/200.78; 395/200.31; 395/551; 395/555; 395/556; 395/558; 395/800.01
[58] Field of Search ................................ 395/200.17, 800, 395/200.31, 200.78, 800.01, 551, 555, 556, 558; 364/DIG. 1, 270.5, 270.7, 270.9, 271, 271.4

[56] References Cited

U.S. PATENT DOCUMENTS

| | | | |
|---|---|---|---|
| 4,815,110 | 3/1989 | Benson et al. | 375/107 |
| 5,041,966 | 8/1991 | NaKai et al. | 364/200 |
| 5,276,659 | 1/1994 | Kotaki | 368/10 |
| 5,327,468 | 7/1994 | Edblab et al. | 375/107 |
| 5,402,424 | 3/1995 | Kou | 370/95.3 |
| 5,550,873 | 8/1996 | Dolev et al. | 375/354 |
| 5,689,688 | 11/1997 | Strong et al. | 395/553 |

OTHER PUBLICATIONS

Lindsey, W. Network Synchronization of Random Signals. IEEE Transactions on Communications, vol. COM–28, Aug., 1980.

Mills, D. Internet Time Synchronization: The Network Time Protocol. IEEE Transactions on Communication, vol. 39, No. 10, Oct., 1991.

Proceedings of the Third Annual ACM Symposium on Principles of Distributed Computing, pp. 89–102, Aug. 27–29, 1984.

Proceedings of the Third Annual ACM Symposium on Principles of Distributed Computing, pp. 75–88, Aug. 27–29, 1984.

Srikanth, T.K. Optimal Clock Synchronization. Journal of the Association for Computing Machinery, vol. 34, No. 3, Jul. 1987.

Mills, D. On the Chronometry and Metrology of Computer Network Timescales and their Application to the Network Time Protocol. date unknown.

(List continued on next page.)

*Primary Examiner*—Alyssa H. Bowler
*Assistant Examiner*—Dzung C. Nguyen
*Attorney, Agent, or Firm*—Lee & Hayes PLLC

[57] ABSTRACT

Described herein is a distributed computer system having a plurality of computer nodes arranged logically adjacent to each other in a communications ring. Each computer node receives communications from a preceding computer node and sends communications to a succeeding computer node. The computer nodes maintain individual local clocks with local time values c. The clocks are synchronized to each other through a sequence of distributed processing steps. The steps include a step of measuring an approximate local offset d of the local time value of each computer node relative to the local time value of a logically adjacent computer node in the communications ring. A subsequent step includes passing a plurality of collation variables from a lead computer node, through the computer nodes forming the communications ring, and back to the lead computer node in a single pass. The collation variables are processed at each computer node as they are passed around the communications ring. This processing is based at least in part on the measured approximate local offsets d at each computer node. The lead computer then calculates a difference m between its local time value and the mean of the local time values of all the computer nodes based upon the collation variables received back at the lead computer node after being passed around the communications ring. Based upon difference m, values are provided to the distributed computer nodes representing their offsets from the mean. Each computer node then adjusts the rate of its local clock to achieve synchronization. To prevent frequency runaway, each computer node updates its clock through a PLL which limits the amount of correction which can be applied to the local clock.

65 Claims, 6 Drawing Sheets

OTHER PUBLICATIONS

Marzullo, K. Maintaining the Time in a Distributed System. Association for Computing Machinery, 1983.

Rickert, N. Non Byzantine Clock Synchronization—a Programming Experiment. ACM Operating System Review, vol. 22, No. 1, Jan. 1988.

Cole, R. An Experiment in Clock Synchronisation. The Computer Journal, vol. 31, No. 6, 1988.

Abate, J. AT&T's New Approach to the Synchronization of Telecommunication Networks. IEEE Communications Magazine, Apr., 1989..

Mills, D. Experiments in Network Clock Synchronization. DARPA Netowrk Working Group Report RFC 957, Sep., 1985.

Kopetz, H. Clock Synchronization in Distrbuted Real–Time Systems, IEEE Transactions on Comoputer, vol. C–36, No. 8, Aug., 1987.

Mills, D. Algorithms for Synchronizing Network Clocks. DARPA Network Working Group Report FRC 956, Sep. 1985.

Mitra, D. Network Synchronization: Analysis of a Hybrid of Master–Slave and Mutual Synchronization, IEEE Transactions on Communications, vol. COM–28, No. 8, Aug., 1980.

Braun, W. Short Term Frequency Instability Effects in Networks of Coupled Oscillators, IEEE Transactions on Communications, vol. COM 28, No. 8, Aug. 1980.

Bell Communications Research. Asynchronous Transfer Mode (ATM) and ATM Adaptation Layer (AAL) Protocols Generic Requirements. Technical Advisory TA–NWT–001113, Issue 1, Aug. 1992.

Bell Communication Research. Digital Network Synchronization Plan. Technical Advisory TA–NWT–00436, Issue 2, Jun. 1993.

Mills, D. The Fuzzball. Association for Computing Machinery, 1988.

Gusella, R. TEMPO: A Network Time Controller for a Distributed Berkeley UNIX System. Proceedings of the USENIX Association Software Tools Users Group, Jun. 1984.

Mills, D. Internet Time Synchronization: The Network Time Protocol. DARPA Network Working Group Report RFC 1129, Oct. 1989.

Mills, D. Network Time Protocol (Version 2) Specification and Implementation. DARPA Network Working Group Report RFC 1119, Sep., 1989.

Mills, D. On the Accuracy and Stability of Clocks Syncronized by the Network Time Protocol in the Internet System. ACM Computer Communication Review 20, Jan. 1990.

SYSTEM AND METHOD FOR SYNCHRONIZING CLOCKS IN DISTRIBUTED COMPUTER NODES

TECHNICAL FIELD

This invention relates to systems and methods for synchronizing local clocks in distributed computing environments.

BACKGROUND OF THE INVENTION

There are a number of situations in which it is desired or required to synchronize the actions of multiple computers. This invention arises in the context of a continuous media server being developed by Microsoft® Corporation to independently supply multiple video streams from a cable system headend to set-top boxes in individual subscriber's homes. One architecture under investigation uses a plurality of cooperating data handlers to supply the video streams. Each data handler comprises a conventional computer with a high-capacity disk storage system.

Superior-quality performance is vital to a video service, and repairs and maintenance must be invisible to users. The Microsoft® architecture features optimal fault tolerance by eliminating all single points of failure and incorporating a repair strategy that minimizes support time. No single hardware failure can shut down the system, so viewers always receive uninterrupted service. In the event of a hardware component failure, the system automatically reconfigures itself to prevent any disruption in data distribution. For example, if one data handler fails, the system redistributes that data handler's responsibilities to other data handlers. Once repairs are made, the system automatically reintegrates the repaired data handler back into operation, while maintaining continual data flow to viewers.

This performance is achieved by distributing data and responsibilities among the plurality of data handlers. For instance, the data for a single video stream is distributed over all the data handlers. The data handlers cooperate to merge their various portions of data into a single continuous data stream. In many cases, it might seem desirable to have a single controller computer for synchronizing and directing the data handlers. However, this would result in a single, critical point of failure. Instead of using this approach, the Microsoft® architecture distributes control responsibilities among the data handlers themselves.

The data handlers are logically connected in a ring topology for data communications with each other. When creating a continuous data stream, a first data handler supplies the first segment of data and then passes responsibility to a second data handler in the ring. The second data handler supplies its data and passes to the third, and so on. Messages are continually passed around the ring to coordinate tasks.

A failure in an individual data handler is handled by bypassing it—the failed data handler is simply cut out of the communications ring and the two surrounding data handlers henceforth communicate directly with each other. Repaired data handlers simply insert themselves into the communications ring.

In order to merge their data, the data handlers must be in very close time synchronization. The particular ring-type architecture of the system, however, makes such synchronization difficult. Many synchronization systems rely on a "master" time-keeper computer, to which all other computers in the system synchronize. In the dynamically configured system described above, however, having a dedicated master is not desirable since it would introduce a single critical point of failure. Furthermore, it is not desirable from a control standpoint to allow different data handlers to act as masters at different times, or to allow each data handler to act as a master to a succeeding data handler. The prior art apparently does not include an adequate method for local clock synchronization in a dynamically changing distributed computing environment such as described above.

SUMMARY OF THE INVENTION

The invention is a system and method for synchronizing the local clocks of distributed computers. Synchronization is achieved as a result of periodic synchronization rounds. In each synchronization round, the mean of all the clocks in the system (or the mean of a sub-set of the clocks) is calculated, and the distributed computers adjust their local clocks using the calculated mean as a reference. No computer acts as a master. Rather, the calculations are distributed among the computers, resulting in a system which is highly scalable and which adapts well to the dynamic addition and deletion of individual computers from the system. A unique PLL is implemented in each computer to prevent frequency runaway.

DETAILED DESCRIPTION OF THE PREFERRED EMBODIMENT

Figure 1:
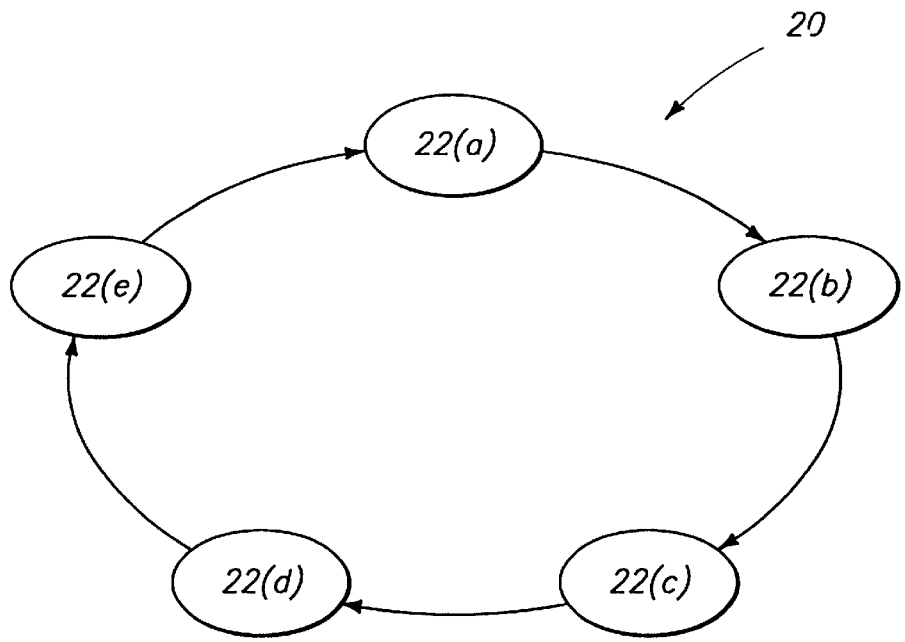
FIG. 1 is a block diagram of a distributed computer system in accordance with a preferred embodiment of the invention.

FIG. 1 shows a distributed computer system 20 in accordance with a preferred embodiment of the invention. Computer system 20 has a plurality of computer nodes 22 arranged logically adjacent each other in a communications ring so that each node 22 receives messages or communications from a preceding computer node and sends messages or communications to a succeeding node. Five nodes—22(a) through 22(e)—are shown in the example of FIG. 1, although more or fewer nodes could be used. In fact, the number of nodes in the communications ring might vary dynamically. For example, a failing node might drop out of the ring and have its responsibilities assumed by other nodes. As nodes are repaired, they might be dynamically added back into the communications ring. A particular strength of the system and methods of the invention are that they can easily accommodate such dynamic variation in the number of functioning nodes in the communications ring.

The arrangement of nodes 22 in FIG. 1 is illustrative of the logical communications scheme used by the nodes and does not necessarily reflect any particular physical arrangement or communications scheme. A variety of physical communications schemes can be employed in conjunction with the invention. For instance, the nodes might communicate over a common, shared network medium with all nodes wired to a central hub. Regardless of the physical scheme, however, the nodes are configured and programmed to communicate primarily along the paths indicated by FIG. 1—each node communicates with the pair of logically adjacent nodes. For instance, node 22(a) communicates with node 22(e) and node 22(b). Furthermore, in accordance with the proposed architecture of the continuous media server described above, communications are initiated predominantly in a single direction. Accordingly, the majority of communications exchanged between node 22(a) and node 22(e) are initiated by messages from node 22(e); similarly, the majority of communications exchanged between node 22(a) and node 22(b) are initiated by messages from node 22(a). As shown in FIG. 1, the flow of information around the communications ring is in a clockwise direction. In the following discussion, nodes are referred to as "preceding" or "succeeding" a designated reference node. A preceding node is the node from which the reference node receives initial communications. A succeeding node is the node to which the reference node sends initial communications. Node 22(e) precedes node 22(a) and node 22(b) succeeds node 22(a).

Figure 2:
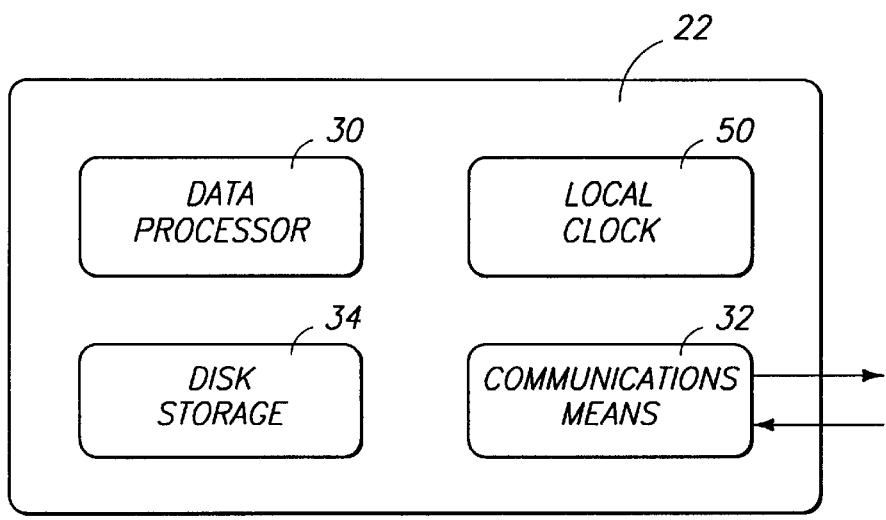
FIG. 2 is a block diagram showing pertinent components of an individual computer node in accordance with a preferred embodiment of the invention.

FIG. 2 shows the most pertinent features of a single computer node 22. Computer node 22 is preferably a high-performance computer such as any number of popular desktop computers. It includes a data processor 30 and communications means 32 for exchanging messages or communications with logically adjacent computer nodes in the communications ring. Communications means 32 might comprise a network adapter card or transceiver. Data processor 30 is programmed to perform the functions described below in conjunction with peripheral devices such as communications means 32.

In the continuous media server for which this invention was developed, each computer node 22 is one of a plurality of individual data handlers at a headend server. Each data handler has a disk storage system 34 with archived portions of continuous data streams. A single data stream is supplied with the cooperation of all the data handlers. For instance, data handler 22(a) might contain the first second of a video data stream, data handler 22(b) might contain the next second of the stream, data handler 22(c) might contain the third second, and so on. Precise synchronization of the data handlers ensures that each of them supplies its portion of the data stream at the correct time. Data redundancy is employed so that other data handlers can take over when any one data handler fails.

Data handler or node 22 has a local clock 50 with a local time value. Local clock 50 may be hardware or software based. In the preferred embodiment described herein, clock 50 has both hardware and software elements. Particularly, local clock 50 includes a hardware-based time-of-day clock that operates at a fixed, non-adjustable rate. However, local clock 50 includes software clock maintenance routines that read time-of-day values from the hardware clock and dynamically adjust those values. The software clock maintenance routines accept a clock rate adjustment factor r upon which the adjustments are based. The routines multiply the rate of the hardware clock by the value 1.0+r.

Table 1 below is a pseudo-code listing in C++ format showing an exemplary clock object:

TABLE 1

```
Class Clock
    {
    public:
        Clock( )                // constructor
            {
            system_base = system.time( );
            adjusted_rate = 1.0;
            adjusted_base = 0;
            }
        Time time( ) const        // report time
            {
            Time system_time = system.time( );
            Time delta = system_time - system_base;
            Time adjusted_time = adjusted_base + delta * adjusted_rate;
            return adjusted_time;
            }
        void time(Time new_time)    // adjust time
            {
            system_base = system.time( );
            adjusted_base = new_time;
            }
        double rate( ) const       // report rate
            {
            return adjusted_rate;
            }
        void rate(double new_rate)  // adjust rate
            {
            Time system_time = system.time( );
            Time delta = system_time - system_base;
            adjusted_base = adjusted_base + delta * adjusted_rate;
            system_base = system_time;
            adjusted_rate = new_rate;
            }
    private:
        Time adjusted_base;
        double adjusted_rate;
        Time system_base;
    };
```

Each clock object maintains three values: adjusted_base, adjusted_rate, and system_base. When the object is instantiated, adjusted_base and adjusted_rate are initialized to 0.0 and 1.0, respectively. A system-provided routine system.time( ) returns the current time value of the hardware-based time-of-day clock and is used to initialize system_base. Variable adjusted_rate is equivalent to the value 1.0+r discussed above.

The clock object function time( ) returns an adjusted time value that is based on the hardware-based time-of-day clock, adjusted by the variables adjusted_rate and adjusted_base. The rate( ) functions allow the current value of adjusted_rate to be read and modified. The time( ) functions allow the current adjusted time value to be read and modified. Note, however, that the synchronization methods disclosed below depend primarily on rate adjustments rather than absolute time or phase adjustments.

The adjusted_base variable contains the adjusted time value at the point when the last adjustment or update was performed. Variable system_base contains the corresponding time value of the hardware clock at the same moment. System_base and adjusted_base are set simultaneously through function time(Time new_time) to set the absolute value of the adjusted time clock. These values are also updated when changing the adjusted rate.

The time( ) function, which reports the current adjusted time, first sets a local variable system_time to the current time value of the hardware clock (through a call to system.time( )). It then sets a local variable delta equal to system_time−system_base, indicating the elapsed time (according to the unadjusted hardware clock) since the last update. This elapsed time is then adjusted by the adjusted rate through the expression delta * adjusted_rate. The result of this adjustment is added to the value of the adjusted_base variable and returned as the adjusted time through local variable adjusted_time. This value will be referred to in the following discussions as the local time c.

Function rate(double new_rate) can be called to change the clock rate to the value of a variable new_rate that is passed as an argument to the function. The function first updates adjusted_base and system_base in order to record new base time values which aggregate the effect of the adjusted rate since the previous adjustment or update. A local variable system_time is set to the current time value of the hardware clock (system.time( )). A local variable delta is then assigned the value system_time−system_base, indicating the elapsed time (according to the unadjusted hardware clock) since the last update. Variable delta is adjusted by the adjusted rate (delta * adjusted_rate) and added to adjusted_base to get the current adjusted time. The result is assigned to adjusted base. Variable system_base is updated with the system time (system_base=system_time). Finally, adjusted_rate is set to new_rate for use in subsequent time adjustments.

The synchronization method and system described below periodically update adjusted_rate in each local clock 50 to achieve synchronization of all the clocks. The clocks are synchronized to the mean of all of their adjusted values. The method and system assume that there is no "master" in the system, and that any of the nodes might fail or drop out of the communications ring at any time. Rate updates are performed periodically in what will be referred to as individual synchronization "rounds." Responsibilities for the various calculations required in deriving a mean value and in calculating rate adjustments are distributed among the nodes of the communications ring. In each synchronization round, one node acts as a "lead" node. The lead node has slightly greater responsibilities than the other nodes, which are referred to as "follower" nodes. However, the lead node is not a "master" node in the typical sense—the follower nodes do not synchronize to the time value of the lead node.

Figure 3:
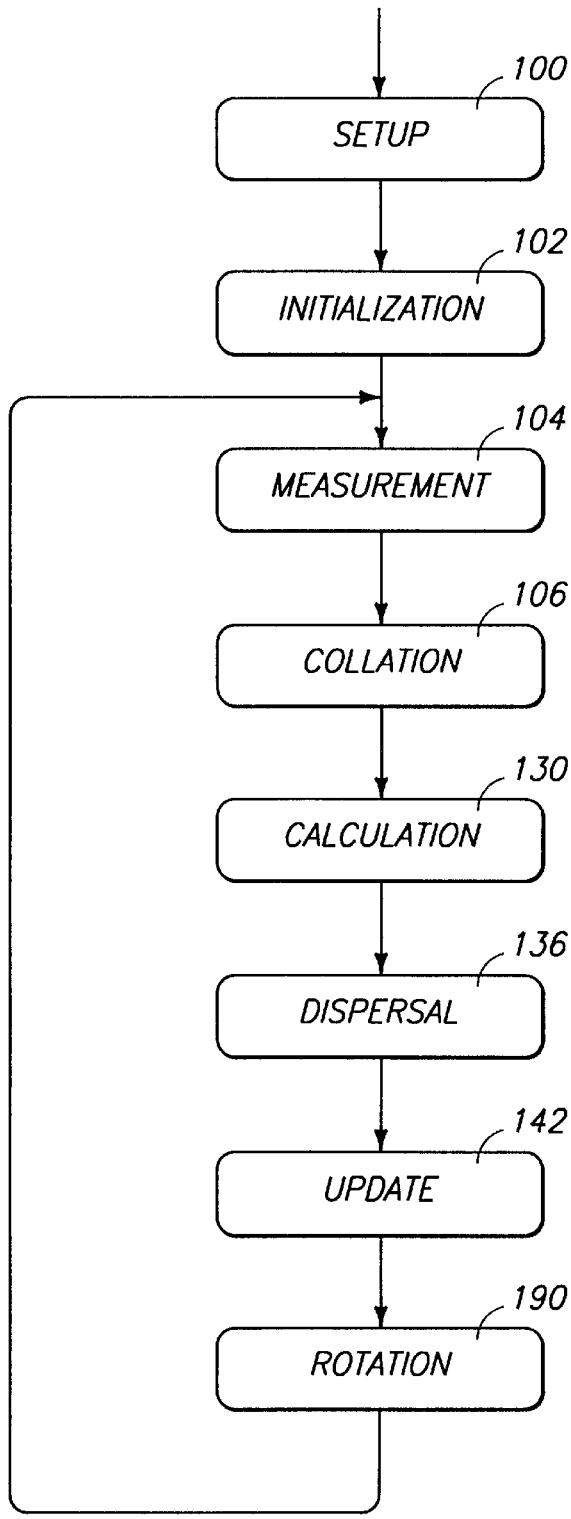
FIG. 3 is a flow chart showing preferred methods of the invention.

FIG. 3 shows steps in accordance with a preferred method of synchronizing the local clocks of distributed nodes 22. These steps are performed by programmed data processors 30 of the various nodes 22 in the communications ring. FIG. 3 shows the steps from an overall perspective. More detailed descriptions will be given of the steps required of individual nodes when they are acting as lead nodes and when they are acting as follower nodes.

The first two steps of FIG. 3, setup and initialization, are performed only at the beginning of synchronization efforts. Setup step 100 comprises arbitrarily designating one of nodes 22 as a "starter" node. The starter node has different responsibilities than other nodes during subsequent step 102.

Initialization step 102 is an initial attempt to provide a very coarse correlation between the local clocks of the nodes. It is performed in two message passes around the communications ring. Initially, the starter node sends a message to the succeeding node, and each node passes the message on to the next succeeding node until the message comes back to the starter. The message contains a variable that is initialized to the value 1 by the starter node and which is incremented by one at each node as it passes around the communications ring. The starter measures the elapsed time for the message to travel around the ring and divides that time by the number of nodes in the communications ring as indicated by the returned variable. The result is a rough estimate of the transmission delay between nodes. This may be repeated a number of times to increase the accuracy of the estimate. Once the approximate node-to-node transmission delay is established in this manner, the starter sends another message around the ring containing two values: (a) the current time value of the starter node's local clock plus the approximated node-to-node transmission delay, and (b) the value of the node-to-node transmission delay itself. Each node receives these two values, sets its local clock to the received time value, increments the time value by the node-to-node transmission delay, and sends the resulting time value and the unaltered value of the transmission delay to the succeeding node. When the message gets back to the starter node, the starter node can optionally check the values for reasonableness.

The initialization step is further illustrated in the pseudo-code of Table 2:

TABLE 2

```
initialization( )
    {
    if (this node is the starter)
        {
        // send first message
        Time start_time = clock.time( );
        send_to_succeeding(1);
        // receive first message and calculate approximate transmission
        delay
        int num_nodes;
        receive_from_preceeding(num_nodes);
        Time loop_time − clock.time( ) - start_time;
        Time delay = loop_time / num_nodes;
        // send second message
        send_to_succeeding(clock.time( ) + delay, delay);
        Time test_time, test_delay;
        receive_from_preceeding(test_time, test_delay);
        sanity_check(clock.time( ), test_time, delay, test_delay);
        }
    else // this node is not the starter
        {
        // receive and send first message
        receive_from_preceeding(value);
        send_to_succeeding(value + 1);
        // receive and send second message
        Time my_time, delay;
        receive_from_preceeding(my_time, delay);
        send_to_succeeding(my_time + delay, delay);
        clock.time(my_time);
        }
    }
```

The starter node begins by setting a local variable start_time to the current value of the local clock through a call to clock.time( ) of the clock object of Table 1. It then sends a first message to the succeeding node with an argument equal to the integer value 1. Succeeding nodes receive the first message, increment the argument, and forward the message to succeeding nodes. When the starter gets the message back, the argument num_nodes indicates the total number of nodes in the communications ring. The starter calculates the total elapsed time by subtracting the starting time start_time from the current time (clock.time( )), and divides that result by the total number of nodes (num_nodes) to get the approximate node-to-node delay, indicated by variable delay.

The starter then sends a second message containing two arguments: the current time plus the approximate node-to-node delay (clock.time()+delay), and the value of delay itself. The succeeding nodes receive the second message, use the first argument to set their own local clocks, increment the first argument by delay, and forward the message to the succeeding nodes. When the starter node receives the message back, it performs a "sanity" check to make sure that all values are reasonable.

Immediately after initialization step 102, all nodes are in approximate agreement as to the current time.

The following steps 104, 106, 130, 136, 142, and 190 are repeated periodically, for each synchronization round. A measurement step 104 is performed by all nodes at the each beginning of each synchronization round. The nodes are programmed to begin this step at a predetermined interval from the last synchronization round. Since all the local clocks are kept in close synchronization, each node can be programmed to begin the measurement step at about the same time. Following steps are initiated only after all the nodes have completed the measurement step.

The purpose of the measurement step is to determine an approximate local offset of the local time value of each computer node relative to a logically adjacent node in the communications ring. More specifically, each node determines the offset d of its local time value c from that of the preceding node. This is accomplished by exchanging time-stamped messages between each pair of adjacent nodes.

Figure 4:
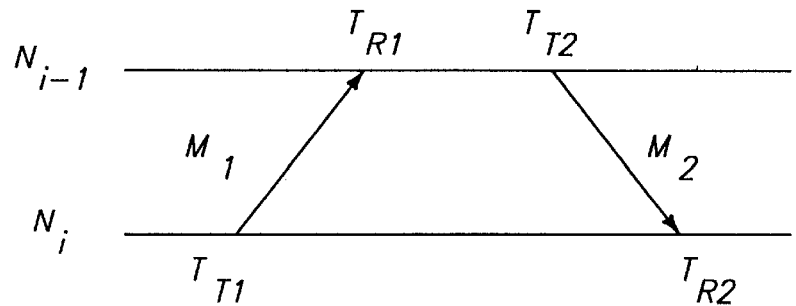
FIG. 4 is an diagrammatic representation of portions of the measurement step of FIG. 3.

FIG. 4 illustrates an example of determining the approximate local offset between the clocks of two nodes $N_i$ and $N_{i-1}$. A first message $M_1$ is sent from node $N_i$ to preceding node $N_{i-1}$ at time $T_{T1}$. Message $M_1$ contains its transmission time $T_{T1}$ as an argument. Message $M_1$ is received at node $N_{i-1}$, and node $N_{i-1}$ records its reception time $T_{R1}$. A second message $M_2$ is sent from node $N_{i-1}$ to node $N_i$ at a second transmission time $T_{T2}$. Message $M_2$ contains $T_{T1}$, $T_{R1}$, and $T_{T2}$ as arguments, and is received at node $N_i$. Node $N_i$ records the time $T_{R2}$ of its reception. Node $N_i$ then calculates approximate local offset $d_i$ of node $N_i$ relative to node $N_{i-1}$ from transmission and reception times $T_{T1}$, $T_{T2}$, $T_{R1}$, and $T_{R2}$ as follows:

$$d_i = \frac{(T_{R1} - T_{T1}) + (T_{T2} - T_{R2})}{2}$$

The derivation of this equation is documented in Mills, *Internet Time Synchronization: The Network Time Protocol*, 39 IEEE Transactions on Communications 1482, 1485–1486 (1991), hereby incorporated by reference. Although the value resulting from this calculation is only an approximation, aggregate measurement error will be accounted for in later steps. Errors due to statistical sampling variation will be smoothed out over multiple rounds of the synchronization protocol.

Since the measurement step is the first step of each synchronization round, it can be reiterated in the interval between synchronization rounds. In the preferred embodiment of the invention, time stamps are included in each communication between adjacent nodes in the time leading up to the next synchronization round, and used to perform the calculation described above. Using this method, the measurement step actually takes place almost continuously in the periods between synchronization rounds.

Collation step 106 follows measurement step 104. Collation step 106 comprises, generally, passing a plurality of collation variables from a "lead" s computer node, through all the nodes forming the communications ring, and back to the lead node in a single pass. Collation step 106 further comprises distributively processing the collation variables at each computer node as they are passed around the communications ring, based at least in part on the measured approximate local offsets d at each computer node. The lead node can be any one of the distributed nodes. Initially, during the first synchronization round, the starter node is designated as the lead node and the remaining nodes act as follower nodes.

Figure 5:
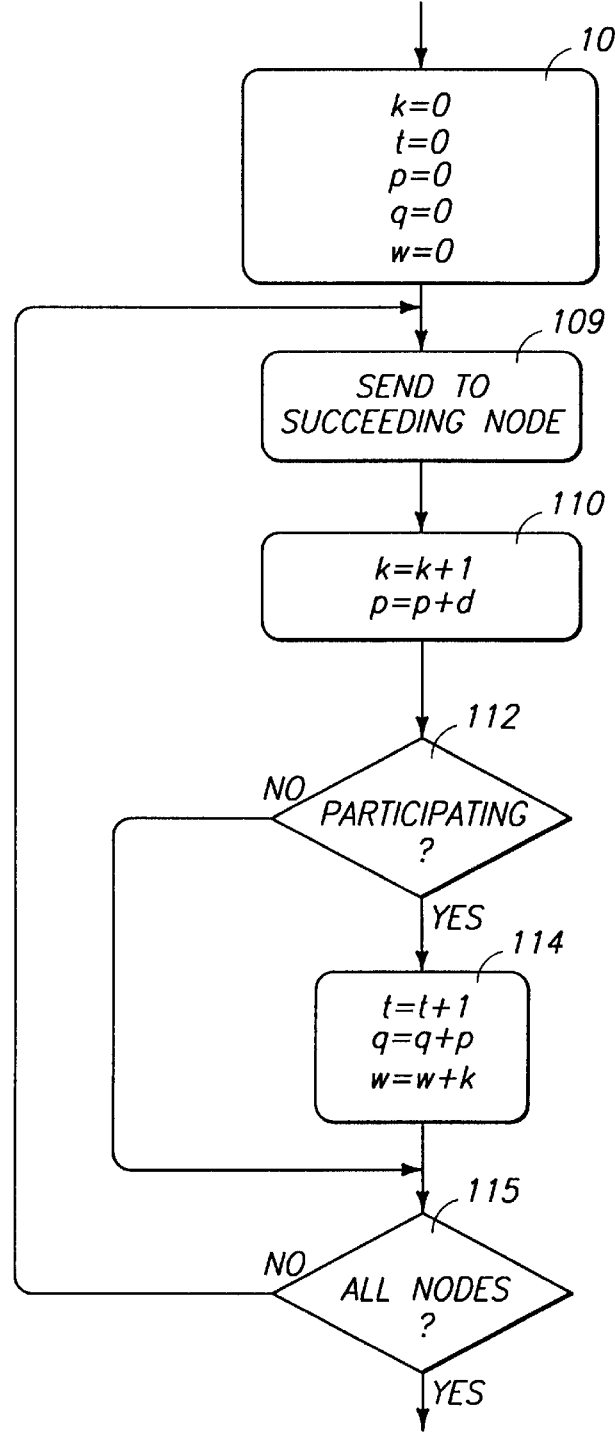
FIG. 5 is a flow chart showing details of the collation step of FIG. 3.

FIG. 5 shows the preferred processing steps. The collation variables include a participating computer node count variable t, an accumulated offset variable p, a summed time value variable q, a computer node count variable k, and a summed computer node count variable w. An initial processing step 108, performed only by the lead computer, comprises initializing all of these variables to zero before passing them from the lead computer to the succeeding computer in the communications ring. Step 109 shows sending the collation variables to the succeeding computer node in the communications ring.

Execution block 110 of FIG. 5 is performed at each node after that node receives the collation variables and before it sends them to the succeeding node. Step 110 includes incrementing the computer node count variable k by one after it is passed to each succeeding computer node. Computer node count variable k represents, after it has been passed back to and incremented by the lead computer node, the total number of computer nodes in the communications ring. Step 110 also includes incrementing the accumulated offset variable p at each respective computer node by the measured approximate local offset d at that respective node after the accumulated offset variable is passed to and received by that respective computer node. Variable p is nominally equal to zero after it has been passed back to and incremented by the lead node—the sum of the offsets around the closed communications ring should equal zero. However, p will usually have a finite s value due to errors in the previous process of measuring d at each node. Therefore, p represents, after it is received back at the lead node, the measurement error in local offsets d accumulated over the values of all nodes in the communications ring. As a mathematical expression, after p is passed around the communications ring $$p = \sum_i d_i,$$

where the expression $$\sum_i d_i$$

indicates the sum of offsets d of all computer nodes in the communications ring.

Step 114 is performed only by "participating" nodes in the communications ring, as indicated by decision block 112. A participating node is one whose local time value c will be used in calculating the mean of time values that will be used as a reference value. A particular node can opt to participate or not to participate. Generally, all nodes will be participating nodes. However, there are certain situations in which a node should not participate, such as when it initially joins the communications ring. When a node first joins the communications ring, its local clock is likely to be significantly out of synchronization with the other clocks. In this case, having the newly joined node participate in the mean calculations might result in an undesirable irregularity in the reference mean.

Step 114 includes incrementing the participating computer node count variable t by one after it is passed to each succeeding computer node that is designated as a participating node. Variable t thus represents, after it has been passed back to and incremented by the lead node (if the lead node is a participating node), the total number of participating computer nodes in the communications ring.

Step 114 also includes incrementing the summed time value variable q at each respective participating computer node (including the lead node if it is a participating node) by the accumulated offset variable p at that respective participating computer node (after p has been incremented at that node). Mathematically, $$q = \sum_j p_j,$$

where the expression $$\sum_j p_j$$

indicates the sum of offset variables p as calculated at each of the participating computer nodes.

Step 114 further includes incrementing the summed computer node count variable w at each participating computer node (including the lead node if it is a participating node) by the total computer node count variable k at that computer node (after k has been incremented at that node). Accordingly, $$w = \sum_j k_j,$$

where the expression $$\sum_j k_j$$

again indicates a summation over all participating nodes.

As indicated by decision block 115, execution returns to step 109 until all computer nodes, including the lead computer node, have had a chance to process the collation variables.

The collation step is further illustrated in the pseudo-code of Table 3. Note that the data processor in any particular node is programmed to configure the node alternatively as a lead node or as a follower node. Different operations are performed, depending on whether the node is configured as a lead or as a follower. Generally, the nodes rotate the lead responsibility after each synchronization round so that the processing load is distributed with time over all the nodes.

TABLE 3

```
static int k, t, w;
static Time p, q;
collation( )
{
    if (this is the lead node)
    {
        send_to_succeeding (0, 0, 0, 0, 0);
        receive_from_preceding(k, t, w, p, q);
        k++;
        p += d;
        if (this node is participating)
        {
            t++;
```

TABLE 3-continued

```
            w += k;
            q += p;
        }
    }
    else (this is a follower node)
    {
        receive_from_preceding(k, t, w, p, q);
        k++;
        p += d;
        if (this node is participating)
        {
            t++;
            w += k;
            q += p;
        }
        send_to_succeeding (k, t, w, p, q);
    }
}
```

Referring again to FIG. 3, a calculation step 130 follows collation step 106. This step involves calculating a difference m at the lead computer node between the local time value c of the lead computer and the mean of the local time values of the participating nodes in the communications ring. This calculation is based upon the collation variables received back at the lead computer node after they are passed around the communications ring. Specifically, difference m is calculated as a function of computer node count variable k, participating computer node count variable t, accumulated offset variable p, summed time value variable q, and summed computer node count variable w.

Figure 6:
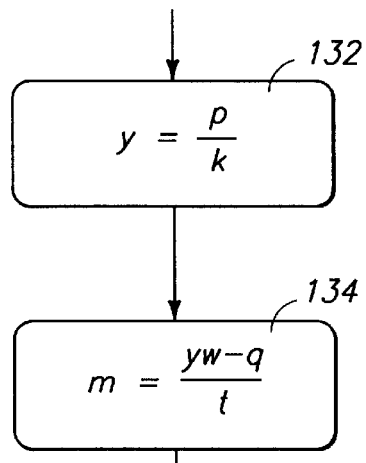
FIG. 6 is a flow chart showing details of the calculation step of FIG. 3.

FIG. 6 shows the calculations of step 130. As indicated in block 132, a first calculation comprises dividing the accumulated offset variable p by the computer node count variable k to obtain an average per-node measurement error y. Variable y represents the averaged error at each computer node in the measured offset values d.

Difference m, disregarding measurement errors in determining local offsets d, can be determined by dividing the summed time value variable q by the participating computer node count variable t. The value −q/t is equal to $$-\sum_j p_j/t.$$

At each node, the value of p is the offset of the local clock relative to the lead computer. This value can be though of as that node's "time value" relative to the time value of the lead node. The value $$\sum_j p_j$$

is a summation of the "time values" from all the participating nodes—referenced to the time value of the lead node. Dividing $$\sum_j p_j \text{ by } t,$$

the total number of participating nodes, gives the mean of the time values of the participating nodes relative to the lead node. The value −q/t is therefore the offset of the lead node relative to the mean of all the participating nodes, at least in the absence of errors in measuring d at each node.

However, the value q is based on p, and p is based on the measured local offsets d. To account for possible errors in the measured values of d, a calculation 134 is performed comprising subtracting the summed time value variable q from the product of the average per-node measurement error y and the summed computer node count variable w, and dividing the result by the participating computer node count variable t. The result is the calculated difference m: m=−(q−yw)/t. This equation is derived as follows:

$$m = -\sum_j (p_j - yk_j)/t, \quad (1)$$

because at each node there is an error in p equal to y times the position (k) of the node in the loop relative to the lead node; therefore $$m = -\left(\sum_j p_j - y\sum_j k_j\right)/t; \text{ and} \quad (2)$$

$$\text{since } q = \sum_j p_j \text{ and } w = \sum_j k_j, \quad (3)$$

$$m = -(q - yw)/t. \quad (4)$$

Figure 7:
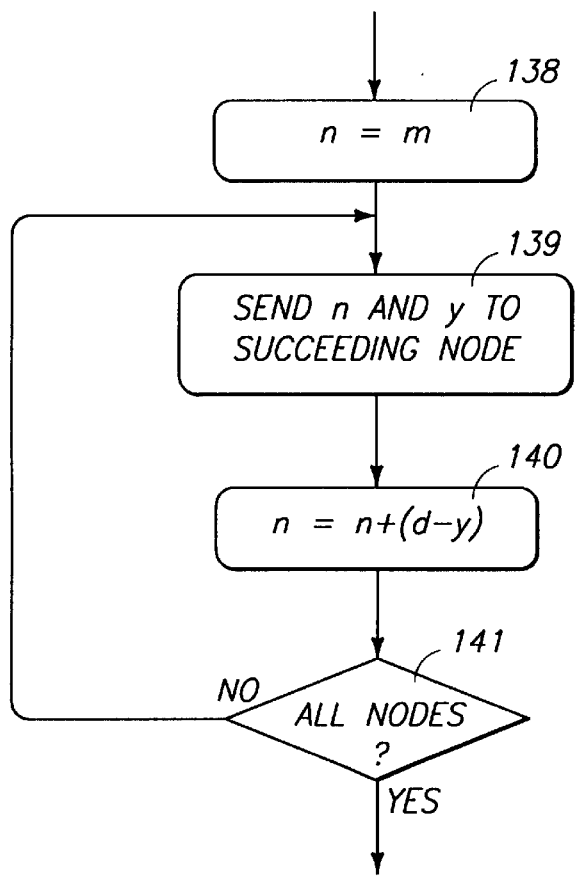
FIG. 7 is a flow chart showing details of the dispersal step of FIG. 3.

Following calculation step 130 is a dispersal step 136. The purpose of dispersal is to distribute the offset information synthesized during the collation and calculation steps. Dispersal begins as shown by execution block 138 in FIG. 7 with initializing a correction variable n to the calculated difference m. This step is performed only in the lead computer node. The lead computer node then passes two dispersal variables from the lead computer node, through the computer nodes forming the communications ring, and back to the lead computer node in a single pass. Execution block 139 of FIG. 7 shows passing the collation variables to the succeeding computer node. The dispersal variables comprise the correction variable n and the average per-node measurement error y. Step 140 comprises processing correction variable n at each computer node as it is passed around the communications ring. The purpose of this processing is to provide a value n at each computer node that is equal to that node's offset from the mean of all the participating computer nodes. Note that this step is performed by all computer nodes in the communications ring—participating and non-participating nodes. Each node calculates its own offset even if it did not participate in calculating the mean.

The processing at each node is based at least in part on the measured approximate local offsets d at each computer node and preferably also accounts for errors in measuring the local offsets d. More specifically, step 140 comprises subtracting the average per-node measurement error y from the computer node's approximate local offset d and adding the result to the correction variable n before passing the correction variable n to the succeeding computer node.

Table 4 shows the pseudo-code for implementing both the calculation and the dispersal steps:

TABLE 4

```
static Time m, n;
dispersal( )
{
    if (this is the lead node)
    {
        y = p/k;
        m = (y*w − q)/t;
        n = m;
```

TABLE 4-continued

```
        send_to_succeeding (n, y);
        Time test_n, test_y;
        receive_from_preceding(test_n, test_y);
        sanity_check(test_n, n, test_y, y);
    }
    else (this is a follower node)
    {
        receive_from_preceding(n, y);
        n += my_offset − y;    // my_offset is the local offset d
        send_to_succeeding (n, y);
    }
}
```

As shown, it may be desirable to perform a "sanity" check when n and y are received back at the lead node, to detect any obvious errors in the process of passing the dispersal variables around the communications ring.

An update step 142 follows dispersal step 136. This step is performed by the computer nodes in parallel, without further inter-node communications. Update step 142 comprises adjusting the local clocks of at least some of the computer nodes as a function of the calculated difference m. More specifically, each computer node adjusts its clock as a function of correction variable n at that computer node, after n has been processed at the computer node. A software-implemented phase-locked loop (PLL) is used for clock adjustments within each computer node during the update step. In general, the update step comprises calculating a new clock rate adjustment factor r at each computer node as a function of the correction variable n at that computer node. A PLL in the prior art might be implemented simply by increasing r during each synchronization interval in response to a positive value of clock offset, and by decreasing r during each synchronization interval in response to a negative value of clock offset. This works well in many prior art environments such as master-slave environments where the PLL is attempting to lock to a fairly constant reference. In the ring-type environment of this invention, however, the PLL is attempting to lock to the mean of all the clocks. Since this mean varies dynamically as the clocks alter their frequencies, the system is vulnerable to frequency runaway. For example, if each node erroneously determines that it is running slightly behind the mean, each node increases its rate slightly to compensate. Since all nodes will have then increased their rates, all nodes might again determine that they are running behind and might again increase their rates. The nodes will actually maintain very close synchronization, but their rates will climb forever higher. There are two sources of error that can lead to this phenomenon: measurement error and computational round-off error. While the effects of measurement error in the steps described above are significantly reduced during the dispersal step, very small remaining errors as well as computation round-off can still lead to frequency runaway.

It has been discovered that frequency runaway can be eliminated by enhancing the feedback loop in the PLL. The preferred methods of the invention include proportionally attenuating the local clock rate adjustment factor r as it approaches upper and lower bounds, thereby constraining r within said upper and lower bounds. More specifically, the PLL within each computer node subtracts a variable adjustment term from correction variable n to obtain a locally adjusted correction variable b. The variable adjustment term is proportional to a previous local clock rate adjustment factor at the computer node and therefore increases with the apparent error of the local clock. New local clock rate adjustment factors r are calculated as a linear function of the locally adjusted correction variable b at that computer node.

Figure 8:
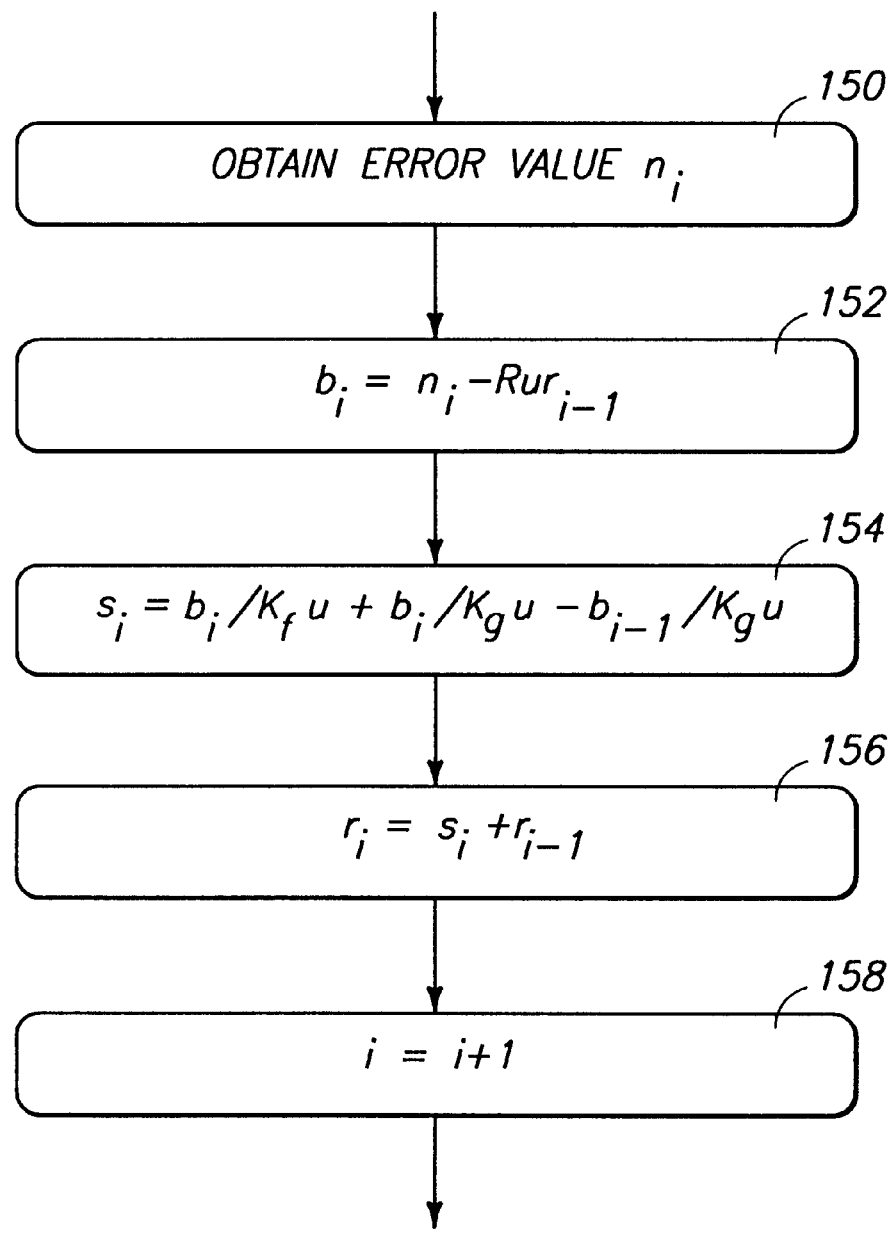
FIG. 8 is a flow chart showing details of the update step of FIG. 3.

This general process is shown in the flow chart of FIG. 8. FIG. 8 shows a general method in accordance with the invention for synchronizing a local clock to a time reference. It is assumed in the steps of FIG. 8 that the local clock can be regulated as a function of a clock rate adjustment factor r as discussed with reference to Table 1.

Step 150 comprises obtaining one of a sequence of error values indicating the offset of the local clock from the time reference. In the specific embodiment disclosed above, the error values comprise a sequence of correction variables n obtained during sequential synchronization rounds and processed in accordance with step 140 of FIG. 7. Error value $n_i$ represents an error value passed via the communications ring during a specific synchronization round i. Note that in this context the subscript i does not identify a specific node in the communications ring. Rather, it represents a particular one of a sequence of synchronization rounds. These steps are performed in each synchronization round by each computer node.

The steps following step 150 result in a sequence of clock rate adjustment factors r calculated to correspond respectively to the sequence of correction variables n. The rate( ) function of Table 1 is called with 1.0+r as an argument to regulate the rate of the local clock in response to this sequence of adjustment factors.

Step 152 comprises calculating an attenuated error value $b_i$. Attenuated error value $b_i$ is the difference between (a) error value $n_i$ and (b) a variable attenuation term that is proportional to a previous clock rate adjustment factor $r_{i-1}$. Specifically, the variable attenuation term is obtained by multiplying the previous adjustment factor $r_{i-1}$ by Ru, where R is a constant and u is the time interval since the last synchronization round.

A subsequent step 154 comprises calculating an adjustment differential $s_i$ as a function of attenuated error value $b_i$. This step is performed by (a) multiplying attenuated error value $b_i$ by a frequency adjustment term $1/K_f u$ to produce a frequency adjustment component $f_i$; (b) multiplying attenuated error value $b_i$ by a phase adjustment term $1/K_g u$ to produce a phase adjustment component $g_i$; (c) summing frequency adjustment component $f_i$ and phase adjustment component $g_i$; and (d) subtracting from the sum the phase adjustment component $g_{i-1}$ of the previous adjustment differential. $K_f$ and $K_g$ are constants.

Clock rate adjustment factor $r_i$ is calculated as indicated in execution block 156 by adding adjustment differential $s_i$ to the previous clock rate adjustment factor $r_{i-1}$. Step 158 comprises incrementing i.

TABLE 5

```
const double Kf; // frequency weight
const double Kg; // phase weight
const Time u;    // update interval
const double R; // resistance to frequency runaway
update( )
{
  static double g1 = 0;
  double r = clock.rate( ) - 1.0;
  Time b = n - R*u*r;
  double f = b/(Kf*u);
  double g = b/(Kg*u);
  double s = f + g - g1;
  r = r + s;
  g1 = g;
  clock.rate(1.0 + r);
}
```

The update routine of Table 5 is called in each computer node after the dispersal step. A persistent variable g1 is initialized to zero. Variable g1 is used to store the value of phase adjustment component g from the last synchronization round. An initial step is to retrieve r, the current adjusted clock rate, from the clock object of Table 1. Since the clock object actually returns r+1.0, 1.0 is subtracted from the returned value. Attenuated error value $b_i$ is then calculated: b=n−Rur. Frequency adjustment component f is calculated as b/($K_f$u). Phase adjustment component g is calculated as b/($K_g$u). Adjustment differential s is calculated as the sum of frequency adjustment component f and phase adjustment component g, minus the previous value of the phase adjustment component, g1. The new clock rate r is calculated as the old value of r plus adjustment differential s. Variable g1 is then updated with the new value of g, and the updated clock rate r is passed to the clock object (incremented by one as expected by the clock object).

Figure 9:
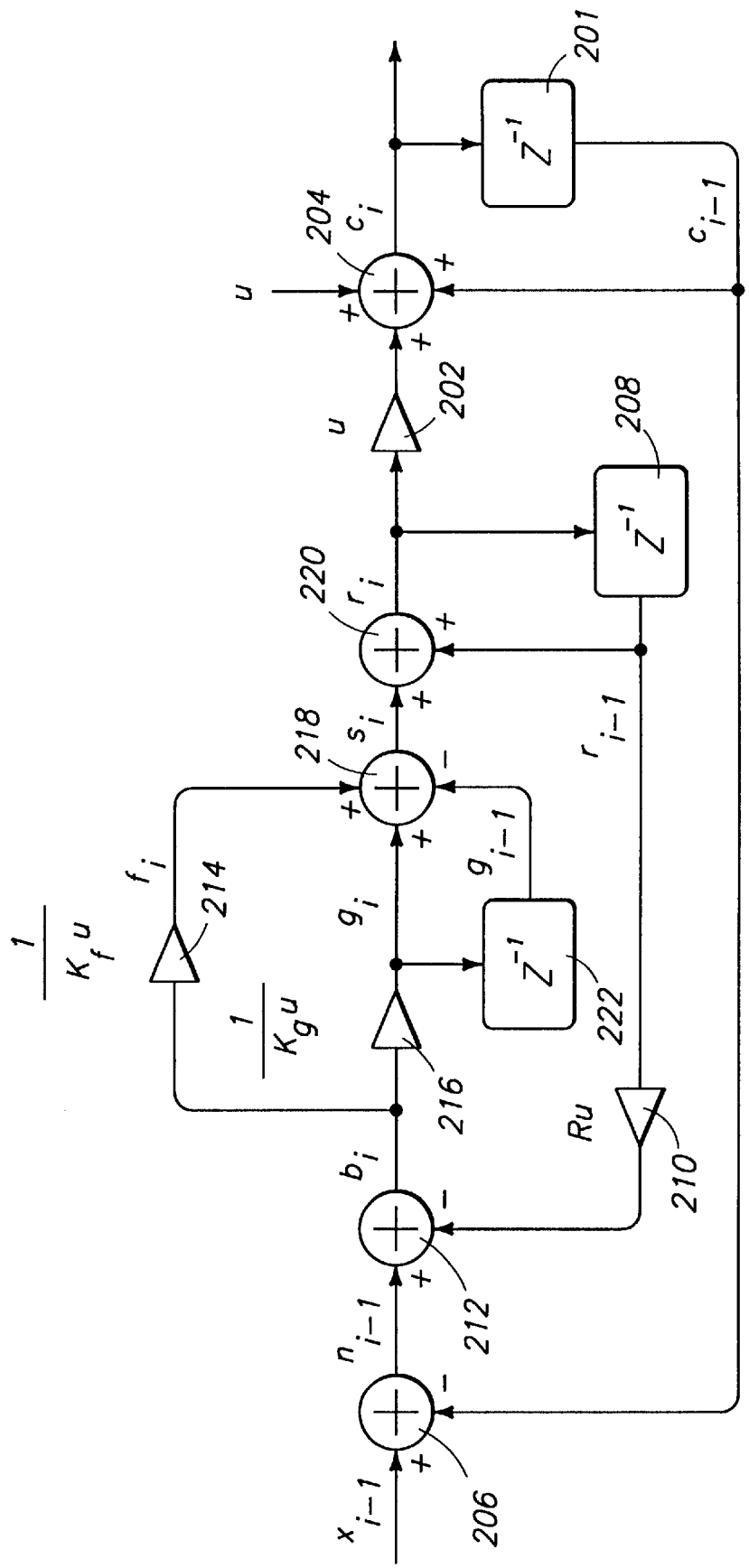
FIG. 9 is a Z-transform block diagram of a phase-locked loop in accordance with the invention.

The PLL implemented by the methods described above can be described in terms of a Z-transform block diagram as in FIG. 9. Variable $c_i$ represents the time value of the local clock at a particular time or synchronization round i. Variable $c_i$ is the result of calculations performed during a previous synchronization round i−1. The value of $c_i$ is the sum of three values: $c_{i-1}$, the time value of the local clock at time i−1; u, the interval between time i−1 and time i; and the product of u and $r_i$, where $r_i$ is a clock rate adjustment factor r discussed above with reference to Table 1. Accordingly, $c_i = c_{i-1} + u + r_i u = c_{i-1} + (1.0 + r_i)u$. The value 1.0+$r_i$ is equivalent to the variable adjusted_rate of Table 1. The value $c_{i-1}$ is obtained by passing $c_i$ through a delay element 201. The value $r_i u$ is obtained through a coefficient element 202. Values $c_{i-1} + u + r_i u$ are summed at a summing junction 204, yielding $c_i$.

The clock rate adjustment factor $r_i$ is derived as follows. Variable $x_{i-1}$, represents the actual mean of the participating clock values c at synchronization round i−1. Value $c_{i-1}$ is subtracted from $x_{i-1}$ at summing junction 206, producing $n_{i-1}$, the offset of the local clock relative to the mean of all the participating clocks. This is the correction variable n calculated at each computer node as described with reference to FIG. 7. Value $r_i$ is passed through a delay element 208 and the resulting value $r_{i-1}$ is multiplied by the value Ru at a coefficient element 210. The result of this operation, Ru$r_{i-1}$ is a variable adjustment term that is subtracted from correction variable $n_{i-1}$ at a summing junction 212 to yield a locally adjusted correction variable $b_i$. Locally adjusted correction variable $b_i$ is multiplied by a frequency adjustment term 1/$K_f$u at coefficient element 214 to produce frequency adjustment component $f_i$. Correction variable $b_i$ is separately multiplied by a phase adjustment term 1/$K_g$u at coefficient element 216 to produce a phase adjustment component $g_i$. The frequency and phase adjustment components $f_i$ and $g_i$ are summed at summing junction 218 to produce an adjustment differential $s_i$. Value $s_i$ is added to the previous value of r ($r_{i-1}$) at summing junction 220 to produce $r_i$. The frequency adjustment component f accumulates in r with each successive synchronization round. However, the phase adjustment component g is to be a once-only correction. Accordingly, during each synchronization round the previous value of g ($g_{i-1}$, obtained through a delay element 222) is subtracted at summing junction 218.

The term Rur increases in magnitude linearly with r. As r increases, the error of the clock, as perceived by the phase and frequency adjustment portions of the PLL, is attenuated. Eventually, if the apparent local offset n is due to sustained measurement errors, the product Rur will become equal to n, and the net value, b, passed to the adjustment portions of the PLL, will drop to zero. At this point, some amount of uncorrected clock offset will remain, but the clock rate will have stabilized.

The various elements of FIG. 9 represent means for accomplishing the clock adjustment functions described with reference to FIG. 8. For instance, coefficient element 202, summing junction 204, and delay element 201 represent means for regulating the rate of the local clock as a function of a clock rate adjustment factor. Delay element 208, coefficient element 210, and summing junction 212 represent means for calculating an attenuated error value. Coefficient elements 214 and 216, delay element 222, and summing junction 218 represent means for calculating an adjustment differential as a function of the attenuated error value. Delay element 208 and summing junction 220 represent means for calculating each sequential clock rate adjustment factor by adding a corresponding adjustment differential to a previous clock rate adjustment factor. While these means are implemented primarily in software in the preferred embodiment, discrete digital circuits could be equivalently used to provide similar or identical functions.

A rotation step 190 follows update step 142. The rotation step comprises designating a new lead computer node for each periodic repetition of steps 104, 106, 130, 136, and 142. In the preferred embodiment, the node which receives a value of 0 in the k variable during the collation step assumes the lead for the following synchronization round.

The invention described above will be useful in a number of environments in which it is desired to synchronize the local clocks of a plurality of interconnected computers. It is particularly useful in the environment of a continuous media server in which individual nodes may fail or drop out of the system at any time. Failure of an individual node can be dealt with very easily at each of the steps outlined in FIG. 3. In the setup and initialization steps, any failure is dealt with by simply aborting and subsequently restarting the entire synchronization process. Assuming that the measurement step occurs during an extended period between synchronization rounds, a failure early in that extended period is handled by waiting until the failed node is patched around, and then starting over with the newly connected node. If it is too late for that, the synchronization round is aborted. In the collation, calculation, and dispersal steps, failures are accommodated by terminating or aborting the synchronization round. In the dispersal step, nodes which have already received the dispersal variable may use them to continue with the update steps. Since the update step is local to each node, failures during that step do not affect anything except the failing node.

There is a potential for the node which is to assume the lead for the next synchronization round to fail. Some mechanism must be provided for designating a new lead should this happen. In the preferred embodiment described herein, one node in each synchronization round will receive a value of 1 in variable k during the collation step. If, during the next synchronization round, this node does not receive the collation variables, it assumes the preceding node has failed. It then terminates the synchronization round and assumes the lead for the next round. This procedure may be extended to deal with multiple node failures.

The system, procedures, and steps described have significant advantages over prior art synchronization methods. For instance, the system is scalable because processing is distributed so that no one node is required to perform a disproportionate amount of work. Additionally, the overall calculations are very minimal. Furthermore, the system does not rely on any single node as a master—no node is indispensable. Nodes can be added to and subtracted from the communications ring at any time without disrupting synchronization efforts.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In a distributed computer system having a plurality of computer nodes arranged logically adjacent to each other in a communications ring so that each computer node receives communications from a preceding computer node and sends communications to a succeeding computer node, wherein the computer nodes maintain local clocks with local time values (c); a method of synchronizing the local clocks, the method comprising the following steps:

measuring an approximate local offset (d) of the local time value (c) of each computer node relative to the local time value (c) of the logically adjacent computer node in the communications ring;

passing a plurality of collation variables from a lead one of the computer nodes, through the computer nodes forming the communications ring, and back to the lead computer node in a single pass;

distributively processing the collation variables at each computer node as they are passed around the communications ring, said processing being based at least in part on the measured approximate local offsets (d) at each computer node;

calculating a difference (m) at the lead computer node between the local time value (c) of the lead computer node and a mean of the local time values (c) of at least some of the computer nodes based upon the collation variables received back at the lead computer node after being passed around the communications ring;

adjusting the local clocks of at least some of the computer nodes as a function of the calculated difference (m).

2. A method as recited in claim 1 and further comprising:

periodically repeating the steps of claim 1;

designating a new lead computer node for each periodic repetition of said steps of claim 1.

3. A method as recited in claim 1 and further comprising an additional step of initializing the collation variables to zero before passing them from the lead computer node.

4. A method as recited in claim 1, the measuring step comprising:

exchanging messages between logically adjacent computer nodes, said messages containing their transmission times;

recording the reception times of the messages;

calculating the approximate local offsets (d) from the transmission and reception times of the messages exchanged between the logically adjacent computer nodes.

5. A method as recited in claim 1, wherein:

the collation variables include a participating computer node count variable (t), an accumulated offset variable (p), and a summed time value variable (q);

the distributive processing step includes a step of incrementing the participating computer node count variable (t) by one after it is passed to each succeeding computer node which is designated as a participating computer node; the participating computer node count variable (t) representing, after it has been passed back to the lead computer node, the total number of participating computer nodes in the communications ring;

the distributive processing step further includes a step of incrementing the accumulated offset variable (p) at each respective computer node by the measured approximate local offset (d) at that respective computer node after the accumulated offset variable (p) is passed to that respective computer node; the accumulated offset variable (p) representing, after it has been passed back to the lead computer node, the accumulated measurement error in the measured local offsets (d);

the distributive processing step further includes a step of incrementing the summed time value variable (q) at each respective participating computer node by the accumulated offset variable (p) at that respective participating computer node after the summed time value variable (q) is passed to the respective participating computer node;

the calculating step includes dividing the summed time value variable (q) by the participating computer node count variable (t), wherein the result of said dividing represents the calculated difference (m), disregarding local offset measurement errors.

6. A method as recited in claim 1, wherein:
the collation variables include a computer node count variable (k) and an accumulated offset variable (p);

the distributive processing step includes a step of incrementing the computer node count variable (k) by one after it is passed to each succeeding computer node; the computer node count variable (k) representing, after it has been passed back to the lead computer node, the total number of computer nodes in the communications ring;

the distributive processing step further includes a step of incrementing the accumulated offset variable (p) at each respective computer node by the measured approximate local offset (d) at that respective computer node after the accumulated offset variable (p) is passed to the respective computer node; the accumulated offset variable (p) representing, after it has been passed back to the lead computer node, the accumulated measurement error in the measured local offsets (d);

the calculating step includes dividing the accumulated offset variable (p) by the computer node count variable (k) to obtain an average per-node measurement error (y).

7. A method as recited in claim 6, wherein:
the calculating step further includes calculating the calculated difference (m) as a function of the average per-node measurement error (y);

the method further comprises:
initializing a correction variable (n) to the calculated difference (m); passing the average per-node measurement error (y) and the correction variable (n) from the lead computer node through the computer nodes forming the communications ring;

at each computer node, subtracting the average per-node measurement error (y) from the computer node's approximate local offset (d) and adding the result to the correction variable (n) before passing the correction variable (n) to the succeeding computer node;

at each computer node, adjusting the computer node's local clock as a function of the correction variable (n).

8. A method as recited in claim 1 and further comprising:
initializing a correction variable (n) to the calculated difference (m);

passing a correction variable (n) from the lead computer node through the computer nodes forming the communications ring;

at each respective computer node, incrementing the value of the correction variable (n) by the respective computer node's approximate local offset (d) before passing the correction variable (n) to the succeeding computer node;

at each computer node, adjusting the computer node's local clock as a function of the correction variable (n) at that computer node.

9. A method as recited in claim 1, wherein:
the collation variables include a total computer node count variable (k), a participating computer node count variable (t), an accumulated offset variable (p), a summed time value variable (q), and a summed computer node count variable (w), all of the collation variables being initialized to zero before passing them from the lead computer node;

the distributive processing step includes a step of incrementing the total computer node count variable (k) by one after it is passed to each succeeding computer node; the total computer node count variable (k) representing, after it has been passed back to the lead computer node, the total number of computer nodes in the communications ring;

the distributive processing step further includes a step of incrementing the participating computer node count variable (t) by one after it is passed to each succeeding computer node which is designated as a participating computer node; the participating computer node count variable (t) representing, after it has been passed back to the lead computer node, the total number of participating computer nodes in the communications ring;

the distributive processing step further includes a step of incrementing the accumulated offset variable (p) by the measured approximate local offset (d) of a particular computer node after the accumulated offset variable (p) is passed to that particular computer node; the accumulated offset variable (p) representing, after it has been passed back to the lead computer node, the accumulated measurement error in the measured local offsets (d);

the distributive processing step further includes a step of incrementing the summed time value variable (q) at each respective participating computer node by the accumulated offset variable (p) at that respective participating computer node after the summed time value variable (q) is passed to the respective participating computer node;

the distributive processing step further includes a step of incrementing the summed computer node count variable (w) at each respective participating computer node by the total computer node count variable (k) at that respective participating computer node after the summed computer node count variable (w) is passed to the respective participating computer node;

the calculating step includes calculating the difference (m) as a function of the total computer node count variable (k), the participating computer node count variable (t), the accumulated offset variable (p), the summed time value variable (q), and the summed computer node count variable (w).

10. A method as recited in claim 9, the measuring step comprising:

exchanging messages between logically adjacent computer nodes, said messages containing their transmission times;

recording the reception times of the messages;

calculating the approximate local offsets (d) from the transmission and reception times of the messages exchanged between the logically adjacent computer nodes.

11. A method as recited in claim 9, wherein the calculating step further includes:

dividing the accumulated offset variable (p) by the total computer node count variable (k) to obtain an average per-node measurement error (y);

subtracting the summed time value variable (q) from the product of the average per-node measurement error (y) and the summed computer node count variable (w); and dividing the result by the participating computer node count variable (t) to obtain the calculated difference (m) between the time value (c) of the lead computer node and the mean of the time values (c) of the participating computer nodes, said calculated difference (m) accounting for local offset measurement errors.

12. A method as recited in claim 9, wherein the calculating step further includes:

dividing the accumulated offset variable (p) by the total computer node count variable (k) to obtain an average per-node measurement error (y);

subtracting the summed time value variable (q) from the product of the average per-node measurement error (y) and the summed computer node count variable (w); and dividing the result by the participating computer node count variable (t) to obtain the calculated difference (m) between the time value (c) of the lead computer node and the mean of the time values (c) of the participating computer nodes;

the method further comprising:

initializing a correction variable (n) to the calculated difference (m);

passing the average per-node measurement error (y) and the correction variable (n) from the lead computer node and through the computer nodes forming the communications ring;

at each computer node, subtracting the average per-node measurement error (y) from the computer node's approximate local offset (d) and adding the result to the correction variable (n) before passing the correction variable (n) to the succeeding computer node;

at each computer node, adjusting the computer node's local clock as a function of the correction variable (n) at that computer node.

13. A method as recited in claim 12, the measuring step comprising:

exchanging messages between logically adjacent computer nodes, said messages containing their transmission times;

recording the reception times of the messages;

calculating the approximate local offsets (d) from the transmission and reception times of the messages exchanged between the logically adjacent computer nodes.

14. A method as recited in claim 12, wherein each local clock has a rate which is a function of a rate adjustment factor (r), the method further comprising:

at each computer node, calculating a local clock rate adjustment factor (r) based at least in part upon the correction variable (n) at that computer node;

at each computer node, constraining the local clock rate adjustment factor (r) within upper and lower bounds.

15. A method as recited in claim 12, wherein each local clock has a rate which is a function of a rate adjustment factor (r), the method further comprising:

at each computer node, calculating a local clock rate adjustment factor (r) based at least in part upon the correction variable (n) at that computer node;

at each computer node, proportionally attenuating the local clock rate adjustment factor (r) as it approaches upper or lower bounds to constrain the local clock rate adjustment factor (r) within said upper and lower bounds.

16. A method as recited in claim 12, wherein each local clock has a rate which is a function of a rate adjustment factor (r), the method further comprising:

at each computer node, subtracting an adjustment term from the correction variable (n) at that computer node to obtain a locally adjusted correction variable (b), the adjustment term being proportional to a previous local clock rate adjustment factor ($r_{i-1}$) at the computer node;

at each computer node, calculating a new local clock rate adjustment factor ($r_i$) as a function of the locally adjusted correction variable (b) at that computer node.

17. A method as recited in claim 1, wherein each local clock has a rate which is a function of a rate adjustment factor (r), the method further comprising:

initializing a correction variable (n) to the calculated difference (m);

passing the correction variable (n) from the lead computer node and through the computer nodes forming the communications ring in a single pass;

processing the correction variable (n) at each computer node as it is passed around the communications ring, said processing being based at least in part on the measured approximate local offsets (d);

at each computer node, calculating a new local clock rate adjustment factor ($r_i$) based at least in part upon the correction variable (n) at that computer node.

18. A method as recited in claim 17 and further comprising the following additional step:

at each computer node, constraining the new local clock rate adjustment factor ($r_i$) within upper and lower bounds.

19. A method as recited in claim 17 and further comprising the following additional step:

at each computer node, proportionally attenuating the new local clock rate adjustment factor ($r_i$) as it approaches upper or lower bounds to constrain the new local clock rate adjustment factor ($r_i$) within said upper and lower bounds.

20. A method as recited in claim 17 and further comprising the following additional steps:

at each computer node, subtracting an adjustment term from the correction variable (n) to obtain a locally adjusted correction variable (b), the adjustment term being proportional to a previous local clock rate adjustment factor ($r_{i-1}$) at the computer node;

at each computer node, calculating the new local clock rate adjustment factor ($r_i$) as a function of the locally adjusted correction variable (b) at that computer node.

21. A method of synchronizing a local clock to a time reference, the method comprising:

regulating the rate of the local clock as a function of a clock rate adjustment factor;

obtaining a periodic sequence of error values indicating the offset of the local clock from the time reference;

for each respective error value in the sequence, changing the clock rate adjustment factor as a function of the respective error value;

attenuating changes in the clock rate adjustment factor by a variable term that constrains the clock rate adjustment factor within upper and lower bounds.

22. A method as recited in claim 21 and further comprising increasing the magnitude of the variable term in response to an increasing magnitude of the clock rate adjustment factor.

23. A method of synchronizing a local clock to a time reference, the method comprising:

obtaining a periodic sequence of error values indicating the offset of the local clock from the time reference;

regulating the rate of the local clock as a function of a sequence of clock rate adjustment factors calculated to correspond respectively to the error values;

calculating each sequential clock rate adjustment factor by adding a corresponding adjustment differential to a previous clock rate adjustment factor;

calculating the adjustment differential corresponding to a particular clock rate adjustment factor as a function of an attenuated error value, the attenuated error value being the difference between (a) the error value corresponding to the particular clock rate adjustment factor and (b) a variable attenuation term which is proportional to a previous clock rate adjustment factor.

24. A method as recited in claim 23 wherein calculating the adjustment differential comprises multiplying the attenuated error value by a frequency adjustment term to produce a frequency adjustment component of the adjustment differential.

25. A method as recited in claim 23 wherein calculating the adjustment differential comprises:

multiplying the attenuated error value by a phase adjustment term to produce a phase adjustment component of the adjustment differential;

subtracting from each adjustment differential the phase adjustment component of a previous adjustment differential.

26. A method as recited in claim 23 wherein calculating the adjustment differential comprises:

multiplying the attenuated error value by a phase adjustment term to produce a phase adjustment component of the adjustment differential;

multiplying the attenuated error value by a frequency adjustment term to produce a frequency adjustment component of the adjustment differential which is added to the phase adjustment component;

subtracting from each adjustment differential the phase adjustment component of a previous adjustment differential.

27. A computer node in a distributed computer system having a plurality of computer nodes arranged logically adjacent to each other in a communications ring so that each computer node receives communications from a preceding node and sends communications to a succeeding node, wherein the computer nodes maintain respective clocks with time values; the computer node comprising:

a data processor;

communications means for exchanging communications with logically adjacent computers in the communications ring;

a local clock having a local time value (c);

the data processor being programmed to perform the following steps:

(i) measuring an approximate local offset (d) of the local time value (c) relative to the time value of the logically adjacent computer node in the communications ring;

(ii) receiving a plurality of collation variables from the preceding computer node in the communications ring;

(iii) processing the collation variables based at least in part on the measured approximate local offset (d);

(iv) sending the processed collation variables to the succeeding computer node in the communications ring;

(v) receiving a correction variable (n) from the preceding computer node in the communications ring, said correction variable (n) being calculated as a function of the processed collation variables;

(vi) adjusting the local clock as a function of the correction variable (n).

28. A distributed computer system comprising a plurality of computer nodes as recited in claim 27.

29. A computer node as recited in claim 27 wherein the correction variable (n) represents a difference between the local time value (c) of the local clock and a mean of the time values of the clocks of participating computer nodes in the communications ring.

30. A computer node as recited in claim 27, wherein:

the collation variables include a participating computer node count variable (t), an accumulated offset variable (p), and a summed time value variable (q);

during the programmed step (iii) of processing the collation variables, the data processor is programmed to perform the following additional steps:

incrementing the participating computer node count variable (t) by one before sending it to the succeeding computer node;

incrementing the accumulated offset variable (p) by the measured approximate local offset (d) before sending the accumulated offset variable (p) to the succeeding computer node;

incrementing the summed time value variable (q) by the accumulated offset variable (p) before sending the summed time value variable (q) to the succeeding computer node.

31. A computer node as recited in claim 27, wherein during the programmed step (i) of measuring an approximate local offset (d), the data processor is programmed to perform the following additional steps:

exchanging messages with the logically adjacent computer node, said messages containing their transmission times;

recording the reception times of the messages;

calculating the approximate local offset (d) from the transmission and reception times of the messages exchanged with the logically adjacent computer node.

32. A computer node as recited in claim 27, wherein:

the collation variables include a computer node count variable (k) and an accumulated offset variable (p);

during the programmed step (iii) of processing the collation variables, the data processor is programmed to perform the following additional steps:

incrementing the computer node count variable (k) by one before sending it to the succeeding computer node;

incrementing the accumulated offset variable (p) by the measured approximate local offset (d) before sending the accumulated offset variable (p) to the succeeding computer node.

33. A computer node as recited in claim 27 wherein the data processor is further programmed for:
processing the correction variable (n) based at least in part on the measured approximate local offset (d);
sending the processed correction variable (n) to the succeeding computer node in the communications ring.

34. A computer node as recited in claim 27, wherein the computer node may be designated as a participating node or a non-participating node, and wherein:
the collation variables include a total computer node count variable (k), a participating computer node count variable (t), an accumulated offset variable (p), a summed time value variable (q), and a summed computer node count variable (w);
the data processor being further programmed for:
incrementing the total node count variable (k) by one before sending it to the succeeding computer node;
if the computer node is designated as a participating computer node, incrementing the participating computer node count variable (t) by one before sending it to the succeeding computer node;
incrementing the accumulated offset variable (p) by the measured approximate local offset (d) before sending the accumulated offset variable (p) to the succeeding computer node;
if the computer node is designated as a participating computer node, incrementing the summed time value variable (q) by the accumulated offset variable (p) before sending the summed time value variable (q) to the succeeding computer node;
if the computer node is designated as a participating computer node, incrementing the summed node count variable (w) by the total node count variable (k) before sending the summed node count variable (w) to the succeeding computer node.

35. A computer node as recited in claim 34, wherein during the programmed step (i) of measuring an approximate local offset (d), the data processor is programmed to perform the following additional steps:
exchanging messages with the logically adjacent computer node, said messages containing their transmission times;
recording the reception times of the messages;
calculating the approximate local offset (d) from the transmission and reception times of the messages exchanged with the logically adjacent computer node.

36. A computer node as recited in claim 34, wherein:
the local clock has a rate which is a function of a clock rate adjustment factor (r);
the data processor is further programmed for:
calculating a new local clock rate adjustment factor (r) as a function of the correction variable (n);
constraining the local clock rate adjustment factor (r) within upper and lower bounds.

37. A computer node as recited in claim 34, wherein:
the local clock has a rate which is a function of a clock rate adjustment factor (r); the data processor is further programmed for:
calculating a new local clock rate adjustment factor (r) as a function of the correction variable (n);
proportionally attenuating the local clock rate adjustment factor (r) as it approaches upper or lower bounds to constrain the local clock rate adjustment factor (r) within said upper and lower bounds.

38. A computer node as recited in claim 34, wherein:
the local clock has a rate which is a function of a clock rate adjustment factor (r);
the data processor is further programmed for:
subtracting an adjustment term from the correction variable (n) to obtain a locally adjusted correction variable (b), the adjustment term being proportional to a previous local clock rate adjustment factor ($r_{i-1}$);
calculating a new local clock rate adjustment factor ($r_i$) as a function of the locally adjusted correction variable (b).

39. A computer node as recited in claim 27, wherein:
the local clock has a rate which is a function of a clock rate adjustment factor (r);
the data processor being further programmed for:
processing the correction variable (n) based at least in part on the measured approximate local offset (d);
sending the processed correction variable (n) to the succeeding computer node in the communications ring;
calculating a new local clock rate adjustment factor ($r_i$) based at least in part upon the correction variable (n).

40. A computer node as recited in claim 39 the data processor being further programmed for constraining the local clock rate adjustment factor ($r_i$) within upper and lower bounds.

41. A computer node as recited in claim 39, the data processor being further programmed for proportionally attenuating the new local clock rate adjustment factor ($r_i$) as it approaches upper or lower bounds to constrain the new local clock rate adjustment factor ($r_i$) within said upper and lower bounds.

42. A computer node as recited in claim 39, the data processor being further programmed for:
subtracting an adjustment term from the correction variable (n) to obtain a locally adjusted correction variable (b), the adjustment term being proportional to a previous local clock rate adjustment factor ($r_{i-1}$);
calculating the new local clock rate adjustment factor ($r_i$) as a function of the locally adjusted correction variable (b).

43. A computer node in a distributed computer system having a plurality of computer nodes arranged logically adjacent to each other in a communications ring so that each computer node receives communications from a preceding node and sends communications to a succeeding node, wherein the computer nodes maintain respective clocks with time values; the computer node comprising:
a data processor;
communications means for exchanging communications with logically adjacent computers in the communications ring;
a local clock having a local time value (c);
the data processor being programmed to configure the computer node alternatively as a lead node and as follower node;
the data processor being programmed when configuring the computer node as a lead node to perform the following steps:
(i) initializing and passing a plurality of collation variables to the succeeding computer node in the communications ring;
(ii) receiving the collation variables back from the preceding computer node in the communications ring;

(iii) calculating a difference (m) between the local time value (c) of the local clock and a mean of the time values of the clocks of other computer nodes in the communications ring based upon the received collation variables;

(iv) adjusting the local clock as a function of the calculated difference (m);

(v) sending a correction variable (n) to the succeeding computer node in the communications ring;

the data processor being programmed when configuring the computer node as a follower node to perform the following steps:

(vi) measuring an approximate local offset (d) of the local time value (c) relative to the time value of the logically adjacent computer node in the communications ring;

(vii) receiving the collation variables from the preceding computer node in the communications ring;

(viii) processing the collation variables based at least in part on the measured approximate local offset (d);

(ix) sending the processed collation variables to the succeeding computer node in the communications ring;

(x) receiving the correction variable (n) from the preceding computer node in the communications ring;

(xi) adjusting the local clock as a function of the correction variable (n).

44. A distributed computer system comprising a plurality of computer nodes as recited in claim 43.

45. A computer node as recited in claim 43, wherein the programmed step (i) of initializing and passing collation variables includes initializing the collation variables to zero.

46. A computer node as recited in claim 43, wherein:

the collation variables include a participating computer node count variable (t), an accumulated offset variable (p), and a summed time value variable (q);

during the programmed step (viii) of processing the collation variables, the data processor is programmed to perform the following additional steps:

incrementing the participating computer node count variable (t) by one before sending it to the succeeding computer node;

incrementing the accumulated offset variable (p) by the measured approximate local offset (d) before sending the accumulated offset variable (p) to the succeeding computer node;

incrementing the summed time value variable (q) by the accumulated offset variable (p) before sending the summed time value variable (q) to the succeeding computer node;

the programmed step (iii) of calculating the difference (m) includes dividing the summed time value variable (q) by the participating computer node count variable (t), wherein the result of said dividing represents the calculated difference (m), disregarding local offset measurement errors.

47. A computer node as recited in claim 43, wherein:

the collation variables include a computer node count variable (k) and an accumulated offset variable (p);

during the programmed step (viii) of processing the collation variables, the data processor is programmed to perform the following additional steps:

incrementing the computer node count variable (k) by one before sending it to the succeeding computer node;

incrementing the accumulated offset variable (p) by the measured approximate local offset before sending the accumulated offset variable (p) to the succeeding computer node;

the programmed step (iii) of calculating the difference (m) includes dividing the accumulated offset variable (p) by the computer node count variable (k) to obtain an average per-node measurement error (y).

48. A computer node as recited in claim 43 wherein:

the programmed step (v) of sending a correction variable includes initializing the correction variable (n) to the calculated difference (m) before sending it to the succeeding computer in the communications ring;

the data processor being further programmed when configuring the computer node as a lead node for:

incrementing the value of the correction variable (n) by the approximate local offset (d);

sending the correction variable (n) to the succeeding computer node in the communications ring.

49. A computer node as recited in claim 43, wherein:

the collation variables include a computer node count variable (k) and an accumulated offset variable (p);

during the programmed step (viii) of processing the collation variables, the data processor is programmed to perform the following additional steps:

incrementing the computer node count variable (k) by one before sending it to the succeeding computer node;

incrementing the accumulated offset variable (p) by the measured approximate local offset before sending the accumulated offset variable (p) to the succeeding computer node;

during the programmed step (iii) of calculating the difference (m), the data processor is programmed to perform the following additional steps:

dividing the accumulated offset variable (p) by the computer node count variable (k) to obtain an average per-node measurement error (y);

calculating the calculated difference (m) as a function of the average per-node measurement error (y);

the data processor being further programmed when configuring the computer node as a lead node for:

initializing the correction variable (n) to the calculated difference (m);

sending the average per-node measurement error (y) to the succeeding computer node in the communications ring in addition to the correction variable (n);

the data processor being further programmed when configuring the computer node as a follower node for:

receiving the average per-node measurement error (y) from the preceding computer node in the communications ring in addition to the correction variable (n);

subtracting the average per-node measurement error (y) from the approximate local offset (d) and adding the result to the correction variable (n);

sending the average per-node measurement error (y) and the correction variable (n) to the succeeding computer node in the communications ring.

50. A computer node as recited in claim 43, wherein the computer node may be designated as a participating node or a non-participating node, and wherein:

the collation variables include a total computer node count variable (k), a participating computer node count variable (t), an accumulated offset variable (p), a summed time value variable (q), and a summed computer node count variable (w), all of the collation variables being initialized to zero before they are passed from the lead computer node;

the data processor being further programmed for:
incrementing the total node count variable (k) by one before sending it to the succeeding computer node;
if the computer node is designated as a participating computer node, incrementing the participating computer node count variable (t) by one before sending it to the succeeding computer node;
incrementing the accumulated offset variable (p) by the measured approximate local offset (d) before sending the accumulated offset variable (p) to the succeeding computer node;
if the computer node is designated as a participating computer node, incrementing the summed time value variable (q) by the accumulated offset variable (p) before sending the summed time value variable (q) to the succeeding computer node;
if the computer node is designated as a participating computer node, incrementing the summed node count variable (w) by the total node count variable (k) before sending the summed node count variable (w) to the succeeding computer node;
the programmed step (iii) of calculating the difference (m) includes calculating the difference (m) as a function of the total computer node count variable (k), the participating computer node count variable (t), the accumulated offset variable (p), the summed time value variable (q), and the summed computer node count variable (w).

51. A distributed computer system comprising a plurality of computer nodes as recited in claim 50.

52. A computer node as recited in claim 50, wherein during the programmed step (iii) of calculating the difference (m), the data processor is programmed to perform the following additional steps:
dividing the accumulated offset variable (p) by the total computer node count variable (k) to obtain an average per-node measurement error (y);
subtracting the summed time value variable (q) from the product of the average per-node measurement error (y) and the summed computer node count variable (w); and dividing the result by the participating computer node count variable (t) to obtain the calculated difference (m) between the time value (c) of the lead computer node and the mean of the time values (c) of the participating computer nodes, said calculated difference (m) accounting for local offset measurement errors.

53. A computer node as recited in claim 50, wherein during the programmed step (iii) of calculating the difference (m), the data processor is programmed to perform the following additional steps:
dividing the accumulated offset variable (p) by the total computer node count variable (k) to obtain an average per-node measurement error (y);
subtracting the summed time value variable (q) from the product of the average per-node measurement error (y) and the summed computer node count variable (w); and dividing the result by the participating computer node count variable (t) to obtain the calculated difference (m) between the time value (c) of the lead computer node and the mean of the time values (c) of the participating computer nodes;
wherein the data processor is further programmed when configuring the computer node as a lead node for:
initializing the correction variable (n) to the calculated difference (m);
passing the average per-node measurement error (y) the succeeding computer node in the communications ring in addition to the correction variable (n);

the data processor being further programmed when configuring the computer node as a follower node for:
receiving the average per-node measurement error (y) from the preceding computer node in the communications ring in addition to the correction variable (n);
subtracting the average per-node measurement error (y) from the approximate local offset (d) and adding the result to the correction variable (n);
sending the average per-node measurement error (y) and the correction variable (n) to the succeeding computer node in the communications ring.

54. A computer node as recited in claim 53, wherein:
the local clock has a rate which is a function of a clock rate adjustment factor (r);
the data processor is further programmed for:
calculating a new local clock rate adjustment factor (r) as a function of the correction variable (n);
constraining the local clock rate adjustment factor (r) within upper and lower bounds.

55. A computer node as recited in claim 53, wherein:
the local clock has a rate which is a function of a clock rate adjustment factor (r);
the data processor is further programmed for:
calculating a new local clock rate adjustment factor (r) as a function of the correction variable (n);
proportionally attenuating the local clock rate adjustment factor (r) as it approaches upper or lower bounds to constrain the local clock rate adjustment factor (r) within said upper and lower bounds.

56. A computer node as recited in claim 53, wherein:
the local clock has a rate which is a function of a clock rate adjustment factor (r);
the data processor is further programmed for:
subtracting an adjustment term from the correction variable (n) to obtain a locally adjusted correction variable (b), the adjustment term being proportional to a previous local clock rate adjustment factor ($r_{i-1}$);
calculating a new local clock rate adjustment factor ($r_i$) as a function of the locally adjusted correction variable (b).

57. A computer node as recited in claim 43, wherein:
the local clock has a rate which is a function of a clock rate adjustment factor (r);
the programmed step (v) of sending a correction variable (n) includes initializing the correction variable (n) to the calculated difference (m);
the data processor being further programmed when configuring the computer node as a follower node for:
processing the correction variable (n) based at least in part on the measured approximate local offset (d);
sending the processed correction variable (n) to the succeeding computer node in the communications ring.
calculating a new local clock rate adjustment factor ($r_i$) based at least in part upon the correction variable (n).

58. A computer node as recited in claim 57 the data processor being further programmed for constraining the local clock rate adjustment factor ($r_i$) within upper and lower bounds.

59. A computer node as recited in claim 57, the data processor being further programmed for proportionally attenuating the new local clock rate adjustment factor ($r_i$) as it approaches upper or lower bounds to constrain the new local clock rate adjustment factor ($r_i$) within said upper and lower bounds.

60. A computer node as recited in claim 57, the data processor being further programmed for:

subtracting an adjustment term from the correction variable (n) to obtain a locally adjusted correction variable (b), the adjustment term being proportional to a previous local clock rate adjustment factor ($r_{i-1}$);

calculating the new local clock rate adjustment factor ($r_i$) as a function of the locally adjusted correction variable (b).

61. A clock for maintaining a local time value in synchronization with a time reference in response to a periodic sequence of error values indicating the offset of the local time value from the time reference, comprising:

means for regulating the rate of the local clock as a function of a clock rate adjustment factor;

means for periodically changing the clock rate adjustment factor as a function of the error values;

means for attenuating changes in the clock rate adjustment factor by a variable term that constrains the clock rate adjustment factor within upper and lower bounds; and means for increasing the magnitude of the variable term in response to an increasing magnitude of the clock rate adjustment factor.

62. A clock for maintaining a local time value in synchronization with a time reference in response to a periodic sequence of error values indicating the offset of the local time value from the time reference, comprising:

means for regulating the rate of the local clock as a function of a sequence of clock rate adjustment factors calculated to correspond respectively to the error values;

means for calculating each sequential clock rate adjustment factor by adding a corresponding adjustment differential to a previous clock rate adjustment factor;

means for calculating the adjustment differential corresponding to a particular clock rate adjustment factor as a function of an attenuated error value, the attenuated error value being the difference between (a) the error value corresponding to the particular clock rate adjustment factor and (b) a variable attenuation term which is proportional to a previous clock rate adjustment factor.

63. A clock as recited in claim 62 wherein said means for calculating the adjustment differential comprises means for multiplying the attenuated error value by a frequency adjustment term to produce a frequency adjustment component of the adjustment differential.

64. A clock as recited in claim 62 wherein said means for calculating the adjustment differential comprises:

means for multiplying the attenuated error value by a phase adjustment term to produce a phase adjustment component of the adjustment differential;

means for subtracting from each adjustment differential the phase adjustment component of a previous adjustment differential.

65. A clock as recited in claim 62 wherein said means for calculating the adjustment differential comprises:

means for multiplying the attenuated error value by a phase adjustment term to produce a phase adjustment component of the adjustment differential;

means for multiplying the attenuated error value by a frequency adjustment term to produce a frequency adjustment component of the adjustment differential which is added to the phase adjustment component;

means for subtracting from each adjustment differential the phase adjustment component of a previous adjustment differential.

\* \* \* \* \*